(12) United States Patent
Schmidt et al.

(10) Patent No.: US 8,760,509 B2
(45) Date of Patent: Jun. 24, 2014

(54) THERMAL IMAGER WITH NON-UNIFORMITY CORRECTION

(75) Inventors: Matthew F. Schmidt, River Falls, WI (US); Kirk R. Johnson, Rogers, MN (US)

(73) Assignee: Fluke Corporation, Everett, WA (US)

(*) Notice: Subject to any disclaimer, the term of this patent is extended or adjusted under 35 U.S.C. 154(b) by 253 days.

(21) Appl. No.: 13/011,846

(22) Filed: Jan. 21, 2011

(65) Prior Publication Data

US 2012/0169866 A1 Jul. 5, 2012

Related U.S. Application Data

(60) Provisional application No. 61/429,079, filed on Dec. 31, 2010.

(51) Int. Cl.
| H04N 7/18 | (2006.01) |
| H04N 5/33 | (2006.01) |
| H04N 5/217 | (2011.01) |

(52) U.S. Cl.
CPC ............... H04N 5/33 (2013.01); H04N 5/332 (2013.01); H04N 5/2176 (2013.01)
USPC ....................................................... 348/135

(58) Field of Classification Search
CPC .................................................... H04N 5/33

USPC ................................................. 348/135, 164
See application file for complete search history.

(56) References Cited

U.S. PATENT DOCUMENTS

| 6,353,223 | B1 | 3/2002 | Ookawa | |
| 6,444,983 | B1 | 9/2002 | McManus et al. | |
| 6,465,785 | B1 | 10/2002 | McManus | |
| 6,538,250 | B2 | 3/2003 | McManus et al. | |
| 6,690,013 | B2 | 2/2004 | McManus | |
| 7,304,297 | B1 | 12/2007 | King et al. | |
| 7,417,230 | B2 | 8/2008 | Anderson et al. | |
| 7,535,002 | B2 | 5/2009 | Johnson et al. | |
| 7,538,326 | B2 | 5/2009 | Johnson et al. | |
| 7,772,557 | B2 | 8/2010 | Anderson | |
| 2005/0231627 | A1* | 10/2005 | Murphy et al. | 348/345 |
| 2006/0279632 | A1* | 12/2006 | Anderson | 348/164 |
| 2008/0099683 | A1* | 5/2008 | Schmidt et al. | 250/353 |
| 2008/0210872 | A1* | 9/2008 | Grimberg | 250/339.04 |
| 2009/0257679 | A1* | 10/2009 | Hogasten | 382/275 |

* cited by examiner

*Primary Examiner* — Andy Rao
*Assistant Examiner* — Jared Walker
(74) *Attorney, Agent, or Firm* — Fredrikson & Byron, P.A.

(57) ABSTRACT

Infrared cameras are susceptible to fixed-pattern noise artifacts. These artifacts are due to numerous sources and typically show up as non-uniformities in an IR image of a uniform scene. Devices for and methods of refining non-uniformity corrections in an infrared (IR) camera are provided that correct for remaining fixed pattern noise.

17 Claims, 3 Drawing Sheets

THERMAL IMAGER WITH NON-UNIFORMITY CORRECTION

The present application claims priority to U.S. Provisional Patent Application No. 61/429,079, filed Dec. 31, 2010, the entire contents of which is incorporated by reference herein.

TECHNICAL FIELD

The present disclosure pertains to thermal imaging cameras with non-uniformity correction.

BACKGROUND

Handheld thermal imaging cameras, for example, including microbolometer detectors to generate infrared (IR) images, are used in a variety of applications, which include the inspection of buildings and industrial equipment. Many state-of-the-art thermal imaging cameras, or IR cameras, have a relatively large amount of built-in functionality allowing a user to select a display from among a host of display options, so that the user may maximize his 'real time', or on-site, comprehension of the thermal information collected by the camera.

As is known, IR cameras generally employ a lens assembly working with a corresponding infrared focal plane array (FPA) to provide an image of a view in a particular axis. The operation of such cameras is generally as follows. Infrared energy is accepted via infrared optics, including the lens assembly, and directed onto the FPA of microbolometer infrared detector elements or pixels. Each pixel responds to the heat energy received by changing its resistance value. An infrared (or thermal) image can be formed by measuring the pixels' resistances—via applying a voltage to the pixels and measuring the resulting currents or applying current to the pixels and measuring the resulting voltages. A frame of image data may, for example, be generated by scanning all the rows and columns of the FPA. A dynamic thermal image (i.e., a video representation) can be generated by repeatedly scanning the FPA to form successive frames of data. Successive frames of thermal image data are generated by repeatedly scanning the rows of the FPA; such frames are produced at a rate sufficient to generate a video representation of the thermal image data.

IR images typically show fixed pattern noise resulting from certain non-uniformities. The non-uniformities often come from physical variations between the pixels in the FPA and from stray energy detected by the FPA. Temperature changes within or surrounding an infrared camera are found to result in the individual pixels further exhibiting their unique response characteristics. In particular, the change in temperature of the camera's internal components, e.g., due to self-heating or as the result of changes to the surrounding ambient temperature, leads to the individual pixels exhibiting fixed pattern noise over extended lengths of time. Non-uniformity correction (NUC) functionality is found in most conventional infrared cameras because it leads to improved imaging capabilities. Examples of NUC methods are disclosed, for instance, in U.S. Pat. Nos. 6,690,013 and 7,417,230 and U.S. Patent Application Publication No. 2006/0279632, which are assigned to the assignee of the present invention and all of which are herein incorporated in their entirety by reference.

"Offset compensation" is one approach to NUC, which can also include 'two-point' (gain/offset) correction. NUC methods can utilize a shutter or be shutterless. NUC methods using a shutter can be an inconvenience to the user as it necessitates activation of the camera shutter, thereby "freezing" the camera image for a short period of time when the shutter is closed. For example, during initial powering of an infrared camera, the internal components can be found to continue to rise in temperature for a period of time before the camera becomes thermally stable. Because of this, offset compensation is often performed at an increased frequency during such period so as to maintain good image quality from the camera. Such increased frequency of offset compensation correspondingly results in an increased frequency of shutter actuation. Consequently, there is further inconvenience for the user as the shutter is closed more often during such period. Therefore, it is desirable to keep the period between offset compensations lengthy so as to limit the general inconvenience to the user of the camera, while still maintaining good image quality.

Even with known NUC methods, whether or not a shutter is employed, non-uniformities often remain that produce various levels of fixed-pattern noise artifacts. These artifacts are due to numerous sources and typically show up as non-uniformities in an image of a uniform scene (e.g., halos, blobs, clouds, etc.). Some of these non-uniformities can be further compensated for by operating the internal shutter as described herein above. However, since the shutter is typically located between the lens and the FPA, the result is less than ideal because there can be sources of stray, i.e., non-scene, radiation that is not seen when the shutter is closed and therefore not adequately compensated for. Non-uniformities resulting from non-scene radiation, including internal stray radiation and stray radiation emitted by lens assembly and/or the lens itself, can be compensated for by using an external shutter placed over the lens outside the camera. However, external shutters usually need to be large, are costly, and are less rugged than internal shutters. Shutter temperature is needed if one wishes to perform radiometric calculations to compute the actual temperature of the scene or target. Radiometry and radiometric imaging are known and are disclosed, for instance, in U.S. Pat. No. 7,304,297, which is assigned to the assignee of the present invention and all of which is herein incorporated in its entirety by reference.

Accordingly, what is needed are an apparatus and systematic methods to address or overcome one or more of the limitations briefly described above with respect to non-uniformities resulting from fixed-pattern noise artifacts in infrared imaging systems and in such imaging systems employing radiometry.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the invention. Like numerals in the appended drawings denote like elements.

Figure 1:
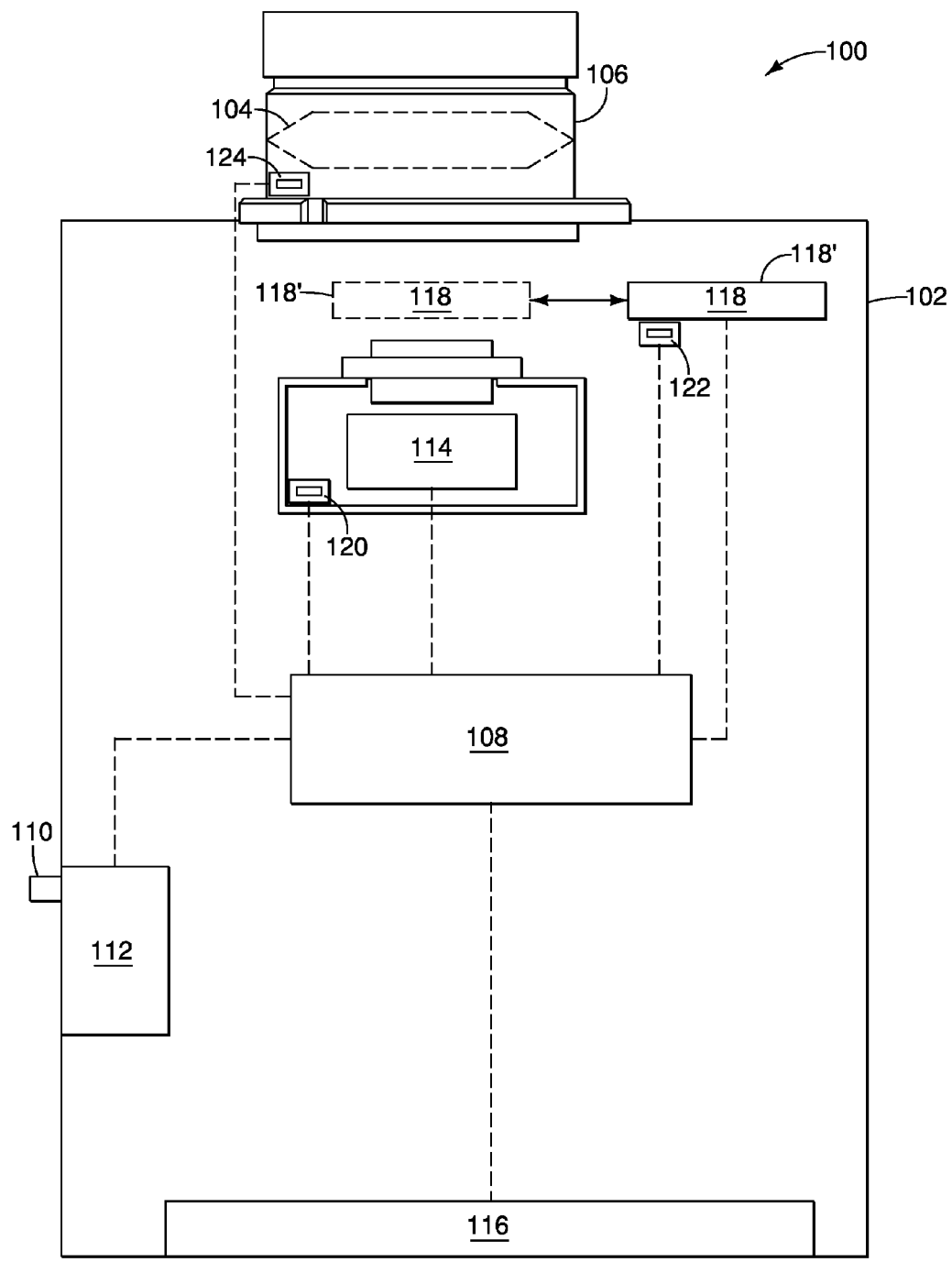
FIG. 1 is a schematic diagram of an infrared camera, according to some embodiments of the present invention.

FIG. 1 is a schematic diagram of IR camera 100 according to an embodiment of the present invention. Camera 100 includes camera housing 102. Housing 102 holds several components including IR lens 104 within lens assembly 106, processor 108, switch 110 operatively coupled to processor 108 through user interface 112, an infrared sensor such as focal plane array (FPA) 114, display 116, internal shutter 118, and one or more sensors of which sensors 120, 122, and 124 are shown in FIG. 1. As illustrated, FPA 114, display 116, shutter 118, and sensors 120, 122, and 124 are also operatively coupled to processor 108. Display 116 is used for displaying infrared images and other information to the user. In an embodiment of the invention, the one or more sensors are temperature sensors, IR lens position sensors, distance to target sensors, current sensors, voltage sensors, or any combination thereof.

In an embodiment of the invention, user interface 112 includes one or more mechanical components and/or control mechanism (not shown) with which the user operates and controls camera 100. For example, camera 100 includes one or more knobs or buttons for adjusting the focus or for triggering shutter 118. In an alternate embodiment, user interface 112 is integrated with and displayed on display 116 whereat the user enters operating and control commands directly on display 116, e.g., via a conventional touch screen. In another embodiment, switch 110 is integrated with and displayed on display 116 whereat the user enters the command for triggering shutter 118.

In an embodiment of the present invention, camera 100 further includes additional electronic, mechanical, and electro-mechanical components and systems, as are well known in the art and not explicitly shown in FIG. 1, that are necessary for operating camera 100. For example, housing 102 includes within it means for positioning and re-positioning shutter 118. The functioning of camera 100 comprising all such components and systems operating cooperatively with the elements described herein above with reference to FIG. 1 are disclosed in the following U.S. Patents and U.S. Patent Applications all of which are assigned to the assignee of the present invention and all of which are herein incorporated in their entirety by reference: U.S. Pat. No. 7,535,002 entitled "Camera With Visible Light And Infrared Blending", U.S. Pat. No. 7,538,326 entitled "Visible Light and IR Combined Image Camera With A Laser Pointer", U.S. Pat. No. 7,772,557 entitled "Offset Compensation Scheduling Algorithm For Infrared Imagers", U.S. Patent Application Publication No. 2006/0279632 entitled "Method For Fixed Pattern Noise Reduction In Infrared Imaging Cameras".

Within housing 102, shutter 118, operatively coupled to processor 108 and typically located relative to lens 104 and FPA 114, operates to open or block the path between lens 104 and FPA 114. As previously described, camera 100 receives image information in the form of infrared energy through lens 104. As such, while shutter 118 is in open position 118', the IR energy from lens 104 is directed onto FPA 114; and while shutter 118 is in closed position 118", the IR energy from lens 104 is blocked from being directed onto FPA 114. As is known in the art, shutter 118 is mechanically positionable such as by actuation of an electro-mechanical device (not shown) such as a DC motor or solenoid.

As can be seen, with shutter 118 in open position 118', the IR energy directed onto FPA 114 comprises IR energy from all objects and surfaces within the line of sight (or field of view) of FPA 114 including objects external to camera 100, lens 104, and components within housing 102. And, with shutter 118 in closed position 118", FPA 114 is exposed to the IR energy emitted by one or more surfaces within the line of sight of FPA 114 including components within housing 102 and the surface of shutter 118 facing FPA 114. Since the IR energy directed onto FPA 114 while shutter 118 is in open position 118' also includes the IR energy from the components within housing 102, devices for and methods of compensating for or minimizing the impact of the IR energy from components within housing 102 have been developed and are well known in the art.

Even using known NUC methods, such as those described above that may or may not use a shutter, fixed pattern noise may still remain. For instance, devices and methods known in the art may not adequately compensate for the stray IR energy emitted from the components of camera 100, such as lens 104, lens assembly 106, and other objects within housing 102, that are blocked from the field of view of FPA 114 when shutter 118 is in closed position 118". Embodiments of the present invention provide methods and devices to minimize or eliminate this residual fixed pattern noise.

Figure 2:
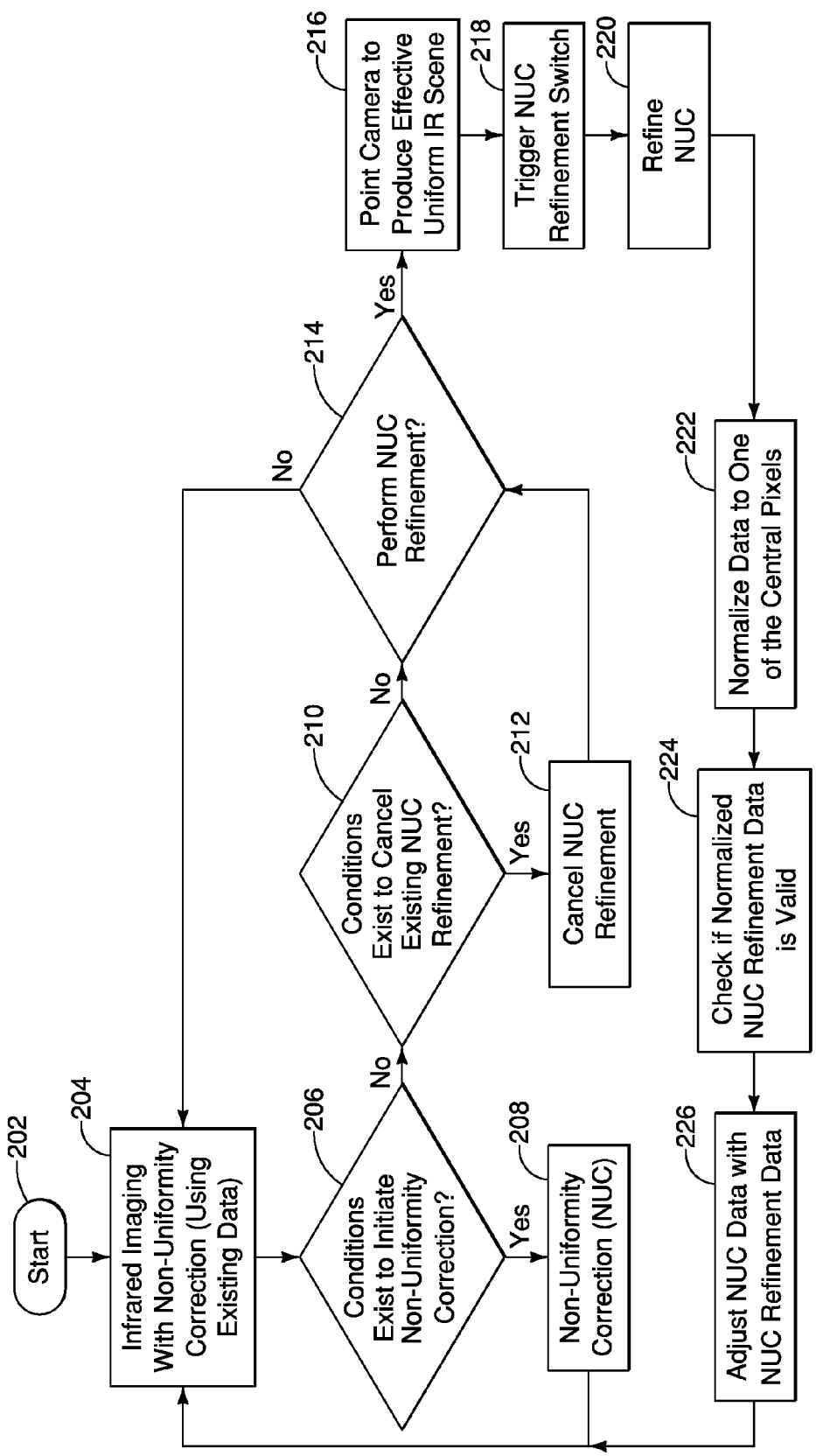
FIG. 2 is a flow chart for a method of correcting for fixed-pattern noise in an IR camera in accordance with an embodiment of the present invention.

In accordance with an embodiment of the present invention, FIG. 2 is a flow chart for a method of correcting for non-uniformities in the IR image that retains the ability to provide radiometric data. If a shutter 118 is used in the NUC, the method also compensates for the IR energy emitted from lens 104 and other components within housing 102 of camera 100 that are blocked or partially blocked from the field of view of FPA 114 when shutter 188 is in closed position 118".

As shown in FIG. 2, the user of IR camera 100 initiates the operation at block 202 by energizing camera 100 and pointing lens 104 to a first scene external to camera 100. IR energy from the first scene enters camera 100 through lens 104 and is directed onto FPA 114. Under control of processor 108, the IR energy from the first scene is processed into a set of IR image data at block 204. To the extent any NUC data has been generated, refined, and/or not canceled (as will be further explained below), the IR energy from the first scene is adjusted with the existing NUC data to provide adjusted or corrected IR image data at block 204, which may be shown on the display.

Next, at block 206, processor 108 determines whether or not the IR image data should be subjected to a NUC. As is well known in the art, NUC is often necessary to produce a usable IR image because of physical variations in the FPA 114 pixels themselves and from need to separate stray from scene energy. In an embodiment of the invention, processor 108 determines whether a NUC is appropriate. In some embodiments of the invention, processor 108 determines that NUC is appropriate in response to one or more of the lapse of a fixed or varying time interval, a change in the lens temperature, a change in the shutter temperature, a change in a position of the lens, length of time since last initiation of the first compensation routine, a change in temperature within the housing, a change in temperature of the housing, a change in temperature outside the housing, a change in a temperature as measured by one or more temperature sensors within the housing, a change in one or more current and/or voltage of a component such as an IR detector element on FPA 114. In an alternate embodiment of the invention, processor 108 determines that NUC is necessary in response to the rate of change in the one or more temperatures. NUC may also be appropriate because it is initiated manually by a user command to the processor 108 made via user interface 112.

Any NUC may be performed in block 208 by methods well known in the art such as those described above. Upon completion of the NUC at block 208, the processing returns to block 204 and the method is cycled through again.

If at block 206 processor 108 determines that NUC is not appropriate, then the method continues at block 210. At block 210, processor 108 determines whether or not any NUC refinement (aka "fine offset") applied previously in the method should be canceled. In the initial operation of the method described in FIG. 2, no NUC refinement exists. NUC refinement is described and defined below in conjunction with later steps in the method of FIG. 2.

At block 214, processor 108 determines whether a refinement of the NUC data is appropriate because of continuing fixed-pattern noise. Even with known NUC methods, whether or not a shutter is employed, non-uniformities often remain that produce various levels of fixed-pattern noise artifacts. These artifacts are due to numerous sources and typically show up as non-uniformities in an image of a uniform scene (e.g., halos, blobs, clouds, etc.). In certain embodiments, the user can initiate a process to refine the NUC data. The user, upon observing such fixed-pattern noise and desiring correction therefor, can command processor 108 to apply such corrections by proceeding to block 216. If the user has not requested a correction for fixed-pattern noise, then processing is returned to block 204 and the method is cycled through again. Of course, it is possible that the processor 108 could automatically determine in block 214 whether a NUC refinement is appropriate instead of or in addition to the user requesting the NUC refinement.

In accordance with an embodiment of the invention, if it is determined in block 214 that a NUC refinement is appropriate or desirable, the method moves to block 216 where the user is directed (via, e.g., display, user interface, past instructions, or user knowledge) to point camera 100 at a second external scene to produce a scene that effectively is of uniform IR energy. Production of an external scene that effectively is of uniform IR energy may be accomplished in several different ways, including pointing the camera at a uniform IR energy scene (e.g., a cloudless sky, some floors, ceilings, or walls, or other bodies of uniform temperature and emissivity), pointing the camera at an external scene located outside of the focus range of the lens (e.g., in close proximity, at a far distance, or on either side of the depth of field of the current focus setting), or pointing the camera at any scene but defocusing the scene by changing the focus setting until the scene is defocused. Once the user points the camera to produce an external scene that effectively is of uniform IR energy, the method proceeds to block 218.

At block 218, the user triggers switch 110. The camera 100 may or may not first prompt the user to trigger switch 110. After triggering switch 110, processor 108 generates an IR image data of the IR energy reaching FPA 114 from the second scene external to camera 100. In certain embodiments of the invention that include a shutter 118, processor 108 retains shutter 118 in open position 118' while camera 100 is being triggered and as such prevents shutter 118 from moving to closed position 118". In certain embodiments of the invention, processor 108 disables any and all lens focusing related functions and operations while camera 100 is being triggered.

Next, at block 220, processor 108 captures the IR image data representing the IR energy from the second scene external to camera 100 and reaching FPA 114 while shutter 118 is retained in open position 118'. Also at block 220 processor 108 executes a NUC refinement routine. In an embodiment of the invention, the algorithms executed by the NUC refinement routine are substantially similar to those used at block 208 for the NUC and as are well known in the art as described herein above. However, unlike the NUC routine executed at block 208, the temperature of the uniform IR scene typically cannot be provided to the processor 108 via a temperature sensor. That is, in the NUC routine at block 208, a sensor 122 can provide the temperature of the uniform IR scene, which is merely the shutter temperature. Such temperature information is important when the camera also functions as a radiometer, as described above, providing absolute temperature data of the infrared scene. However, in the NUC refinement routine at block 220, the actual temperature of the scene external to the camera, whether the scene is unfocused or is of uniform temperature, may not be known.

It is known that the fixed pattern noise remaining following a NUC routine often presents itself in certain patterns, such as a halo around the edges of an IR image. Other patterns may also be present. In such patterns, the centrally located pixels or detector elements are less likely to be subject to the remaining fixed pattern noise. Accordingly, since the temperature of the external scene may not be known at block 222, the results from the NUC refinement routine are normalized at block 222.

In an embodiment of the invention, the normalization is relative to an IR image data associated with at least one of the generally centrally positioned IR detector elements (or average or median from more than one of such pixels) from the plurality of IR detector elements on FPA 114. Such a centrally positioned IR detector element is less likely to have received fixed pattern noise and therefore provides a valuable reference against which the remaining fine offset data may be normalized. The normalization performed may be multiplicative, additive, or other mathematical operation that leaves the central pixel(s) comparatively unchanged and adjusts all the neighboring pixels relative to the difference from central pixel(s) (the difference being the residual fixed pattern noise) as needed to ultimately create a uniform IR image. Further, a particular advantage of this approach is that it causes the radiometric (temperature) calculations for the central pixel(s) to remain unaffected by the fine offset operation and adjusts the radiometric values of the neighboring pixels. Since the NUC refinement routine does not require the use of a shutter or additional components, it can be performed with different types of known NUC routines, as described above, whether or not a shutter is used.

Next, the normalized data from block 222 is validated by processor 108 at block 224. For instance, if the normalized data varies too widely, it may indicate that the NUC refinement data is not reliable or that the second scene was not sufficiently uniform IR imagery. In an embodiment of the invention, processor 108 computes an arithmetic difference between the maximum value and the minimum value associated with the normalized data. If the difference between these maximum and minimum values exceeds a predetermined threshold, then processor 108 discards the normalized data from block 222. In an alternate embodiment of the invention, processor 108 computes an arithmetic average of the normalized data. If the difference between any one of the data comprising the normalized data and the average of the normalized data exceeds a predetermined threshold, then processor 108 also discards the normalized data from block 222. In another embodiment of the invention, processor 108 discards the normalized data from block 222 if the time elapsed since the last triggering exceeds a predetermined threshold. Other known statistical analyses, such as standard deviation analyses, may be performed at block 224 on the normalized data to determine if it is valid.

In an embodiment of the invention wherein the second scene external to camera 100 emits generally uniform IR energy and the normalized data is determined as being valid by block 224, the normalized data from block 222 generally represents the residual non-uniformities resulting in fixed-pattern noise artifacts. The effect of such non-uniformities is then eliminated at block 226 by adjusting the NUC data with the normalized NUC refinement data from block 222. The routine then loops back to block 204, where under control of processor 108, the IR energy from the first scene is processed into a set of IR image. The processor adjusts the image based on any existing NUC data, such as that provided in block 208, or the adjusted NUC data, provided in block 226. By adjusting the NUC data with refinement data, the radiometric information for each pixel calculated with the NUC routine in block 208 is retained and merely adjusted. Even without the use of a scene temperature sensor, such as those used in typical radiometric calculations, the NUC refinement routine maintains radiometric calculations for each pixel. The radiometric value for the central pixel(s) (or other reference pixel (s)) remain unchanged and the neighboring pixels or adjusted based on the normalized NUC refinement data. Thus, the processor may calculate radiometric scene temperature data associated with at least a portion of the first scene based on the IR image data, the NUC data, and the normalized NUC refinement data. The radiometric calculation may be based on the IR image data, and then the resulting radiometric scene data may be adjusted using the NUC data and the normalized NUC refinement data. Alternatively, the radiometric calculation may be based on the IR image data that has been corrected by the NUC data, and then the resulting radiometric scene data may be adjusted using the normalized NUC refinement data. In another embodiment, the radiometric calculation may be based on the IR image data after it has been adjusted with the NUC data after it has been refined by the NUC refinement data. In addition, the radiometric calculation need not be for the entire first scene. That is, the radiometric calculation may be limited to portions of the scene (one or more pixels). The radiometric data may be selectively displayed on the display, as is known in the art.

The routine continues as described above such that the routine returns to block 204. In an embodiment of the invention, the processor determines in block 210 whether to cancel the adjustment of the NUC data via the NUC refinement data. In such an instance, the NUC refinement data is cancelled at block 212, such that only the NUC data (unadjusted) remains. This decision at block 210 may be based on the amount of time lapsed since the prior NUC refinement was applied at block 214. If processor 108 determines that NUC must be cancelled, then this is accomplished in block 212 and the method continues at block 214. In some embodiments, the decision to cancel the fine NUC may also be or instead be based on a threshold temperature change to some camera component, sensed via one of the aforementioned temperature sensors. In some embodiments the decision to cancel the fine NUC may also be or instead be based on a change in lens position, sensed via the aforementioned lens position sensor. In some embodiments, the decision to cancel may be triggered by a user input via the display or other interface.

Figure 3:
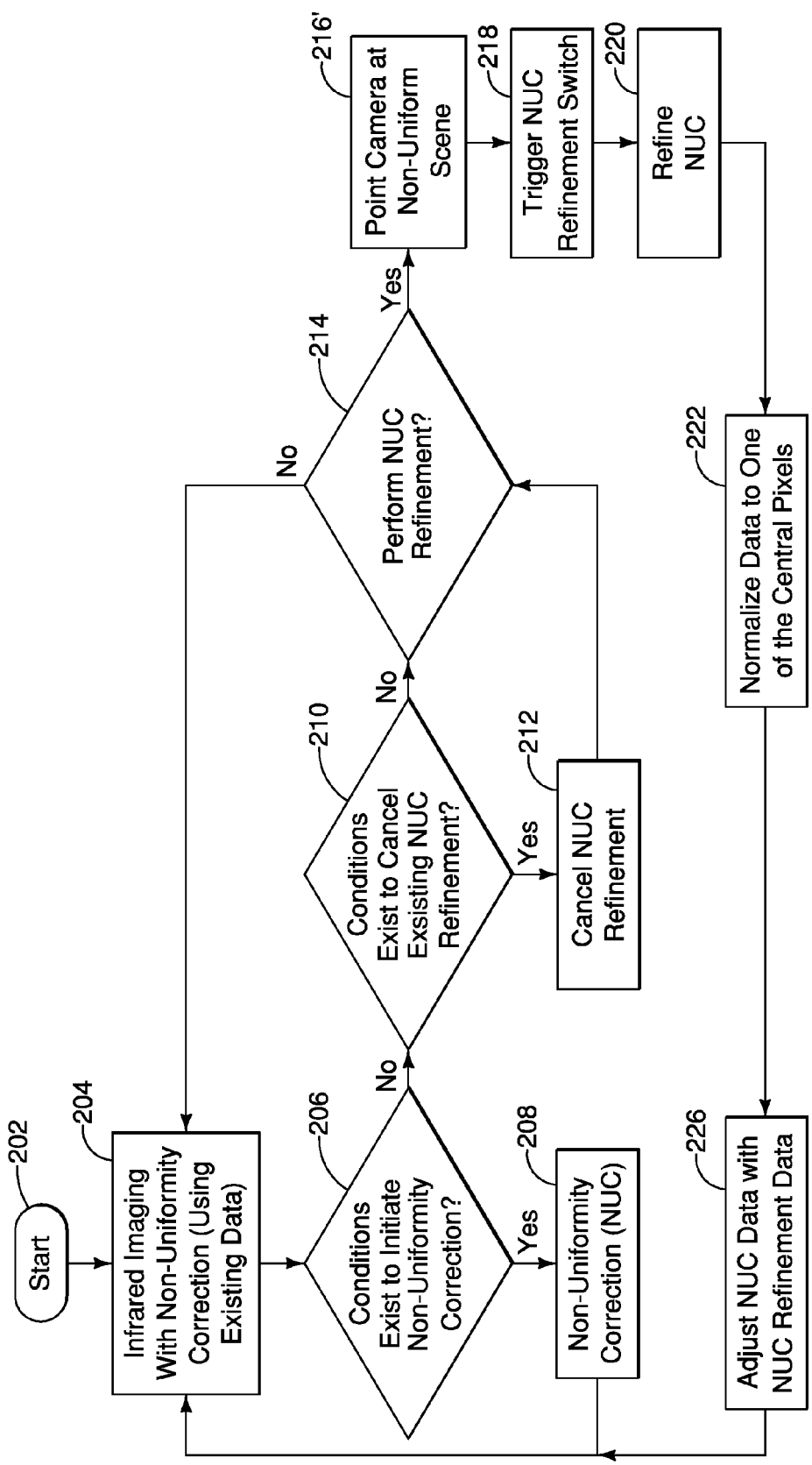
FIG. 3 is a flow chart for a method of correcting for fixed-pattern noise in an IR camera in accordance with an alternate embodiment of the present invention.

FIG. 3 is a flow chart of an alternate embodiment for a method of NUC refinement of an IR image. As can be seen, the steps comprising the method illustrated in FIG. 3, are substantially similar to the steps for the method shown in FIG. 2, wherein like elements are represented by like numerals. Accordingly, detailed descriptions for the steps that are identical between the embodiments of the method, which have been previously described in the foregoing with reference to FIG. 2, will not be repeated herein below with reference to FIG. 3.

The NUC refinement process may also be used to analyze or track temperature changes in a scene over time, for instance, when the IR camera is mounted in a stationary position. The NUC refinement may be used to "zero out" the temperature profile of the scene to create a blank (uniform) IR image. Thereafter, any temperature changes in the scene following the NUC refinement are easily noticeable since they will contrast clearly with the blank IR image created by the NUC refinement. Thus, under certain embodiments of this method, the camera is pointed at the same non-uniform IR scene in step 204 and in step 216.

Accordingly, the above described differences between the embodiments of the methods illustrated in FIGS. 2 and 3 are implemented as follows. At block 216' in FIG. 3, which block replaces block 216 in FIG. 2, the user is continues pointing camera 100 at a scene external to camera 100. As stated, the scene external to camera 100 may be of generally non-uniform IR energy representing a generally non-uniform temperature distribution. The method continues through blocks 218, 220, 222, and 226 as described in the foregoing with reference to FIG. 2. The NUC refinement process associated with these steps removes the "non-uniformities" of the observed scene and adjusts the observed IR image data to the temperature of the central or other reference pixel(s) used in the normalization process of step 222. Thus, while observing a non-uniform IR scene, the observed IR image appears uniform from the NUC refinement process.

Since the embodiment of the method shown in FIG. 3 is for determining and displaying a differential IR image of the scene external to camera 100, block 224 as implemented in reference to the method of FIG. 2, is not necessary. As will be appreciated, inclusion of the step(s) associated with block 224 of FIG. 2 in FIG. 3 will be counter-productive to the generation of a differential IR image as envisioned by the embodiment of the inventive method illustrated in FIG. 3. As can be seen, except for the change from block 216 in FIG. 2 to block 216' in FIG. 3, and the exclusion of block 224 from FIG. 3, all other steps associated with the embodiments of the methods shown in FIGS. 2 and 3 are substantially the same.

In the foregoing detailed description, the invention has been described with reference to specific embodiments. However, it may be appreciated that various modifications and changes can be made without departing from the scope of the invention as set forth in the appended claims.

The invention claimed is:

1. A method of correcting for residual fixed pattern noise in a radiometric infrared (IR) camera, the method comprising:
    pointing the camera at a first scene external to the camera;
    generating sets of IR image data, while pointing the camera at the first scene, said sets of IR image data representative of IR energy received on a focal plane array (FPA) within the camera, the FPA including a plurality of IR detector elements;
    initiating a non-uniformity correction (NUC) routine, the NUC routing including:
        generating a first set of IR image data representative of the IR energy received on the FPA, and
        generating NUC data from the first set of IR image data, the NUC data for correcting fixed pattern noise in the first set of IR image data;
    pointing the camera at a second scene external to the camera to produce a scene that effectively is of uniform IR energy;
    triggering the camera, while pointing the camera at the second scene, and initiating an NUC refinement routine including;

generating a second set of IR image data representative of IR energy received on the FPA from the second scene, generating NUC refinement data from the second set of IR image data, and generating normalized NUC refinement data by normalizing the NUC refinement data relative to IR image data in the second set of IR image data associated with at least one of a generally centrally positioned IR detector element from the plurality of IR detector elements;

generating adjusted NUC data by adjusting the NUC data with the normalized NUC refinement data;

adjusting at least one set of the IR image data with the adjusted NUC data to minimize fixed pattern noise in the at least one set of the IR image data; and calculating radiometric scene temperature data associated with at least a portion of the first scene based on at least a portion of at least one set of the IR image data, the NUC data, and the normalized NUC refinement data.

2. The method of claim 1, wherein the NUC correction routine includes blocking IR energy from the first scene from reaching the FPA before generating the NUC data.

3. The method of claim 2, wherein the blocking is performed using a shutter located inside the radiometric IR camera.

4. The method of claim 1, wherein the NUC correction routine is performed without the use of a shutter located inside the radiometric IR camera.

5. The method of claim 1, wherein pointing the camera at a second scene external to the camera to produce a scene that effectively is of uniform IR energy includes pointing the camera at a uniform IR energy scene.

6. The method of claim 1, wherein pointing the camera at a second scene external to the camera to produce a scene that effectively is of uniform IR energy includes pointing the camera at an external scene located outside of the focus range of the lens.

7. The method of claim 6, wherein the external scene located outside of the focus range of the lens is located in close proximity to a lens of the radiometric IR camera.

8. The method of claim 1, further comprising validating the normalized NUC refinement data to determine whether it varies too widely.

9. The method of claim 8, wherein the normalized NUC refinement data is rejected if it varies too widely.

10. The method of claim 1, further comprising canceling the NUC refinement by removing the normalized NUC refinement data from the adjusted NUC data.

11. The method of claim 10, wherein the canceling the NUC refinement is occurs based on the amount of time lapsed since the prior NUC refinement, based on a threshold temperature change to some component of the radiometric IR camera, based on a change in position of a lens of the radiometric IR camera, or based on receipt of a manual input.

12. The method of claim 1, wherein the at least one of the generally centrally positioned IR detector elements is only one generally centrally positioned IR detector elements.

13. The method of claim 1, further comprising displaying on a display of the radiometric IR camera an IR image of the first scene as represented by the adjusted at least one set of the IR image data.

14. The method of claim 1, further comprising displaying the radiometric scene temperature data associated with at least a portion of the first scene.

15. A method of tracking temperature profile changes in a scene using an infrared (IR) camera, the method comprising:

pointing the camera at a first scene external to the camera, the first scene being of generally non-uniform IR energy;

generating sets of IR image data, while pointing the camera at the first scene, said sets of IR image data representative of IR energy received from the first scene on a focal plane array (FPA) within the camera, the FPA including a plurality of IR detector elements;

initiating a non-uniformity correction (NUC) routine, the NUC routing including:

generating a first set of IR image data representative of the IR energy received on the FPA from the first scene, and generating NUC data from the first set of IR image data, the NUC data for correcting fixed pattern noise in the first set of IR image data;

triggering the camera, while pointing the camera at the first scene, and initiating an NUC refinement routine including;

generating a second set of IR image data representative of IR energy received on the FPA from the first scene, generating NUC refinement data from the second set of IR image data, and generating normalized NUC refinement data by normalizing the NUC refinement data relative to IR image data in the second set of IR image data associated with at least one of a generally centrally positioned IR detector element from the plurality of IR detector elements;

generating adjusted NUC data by adjusting the NUC data with the normalized NUC refinement data;

adjusting at least one set of the IR image data with the adjusted NUC data to minimize fixed pattern noise in the at least one set of the IR image data;

displaying on a display of the IR camera a generally uniform IR image of the first scene as represented by the adjusted at least one set of the IR image data.

16. The method of claim 15, further comprising analyzing the displayed IR image for changes to the temperature profile in the first scene.

17. A radiometric infrared (IR) camera for correcting for residual fixed pattern noise, comprising:

a housing;

a focal plane array (FPA) mounted within the housing and adapted to receive IR energy, the FPA comprising a plurality of IR detector elements and generating sets of IR image data representing IR energy received on the FPA;

a lens mounted on the housing for directing IR energy from a target scene onto the FPA;

a shutter disposed within the housing, the shutter movable between open and closed positions, the closed position being such that the shutter is positioned between the lens and the FPA to prevent IR energy from the target scene from reaching the FPA, the open position permitting IR energy from the scene to reach the FPA;

a switch supported by the housing, the switch, when triggered, initiating a non-uniformity correction (NUC) refinement routine during which the shutter remains in the open position and a first set of IR image data is generated representing IR energy levels received on the FPA from a scene external to the camera;

a processor operatively coupled to the FPA for receiving and processing the sets of IR image data, the processor for initiating a NUC routine during which the shutter is temporarily moved to the closed position and a second set of IR image data is generated representing IR energy received on the FPA while the shutter is in the closed position, the processor generating offset data from the second set of IR image data, the processor generating NUC refinement data from the first set of IR image data, the processor generating adjusted NUC data by adjusting the NUC data with the NUC refinement data, the adjusted NUC data for use by the camera to provide fixed-pattern noise correction; and a display supported by the housing and operatively connected to the processor for displaying an adjusted IR image of the target scene based on the adjusted NUC data.

\* \* \* \* \*